Nov. 13, 1934.    I. A. BUTCHER    1,980,184
CONTROL RECORDING APPARATUS
Filed April 5, 1932
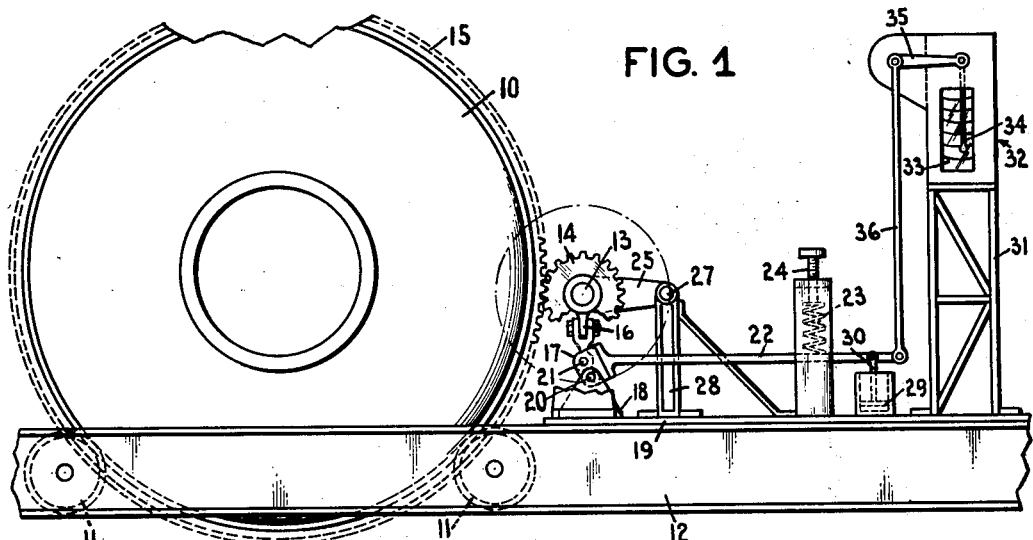
FIG. 1
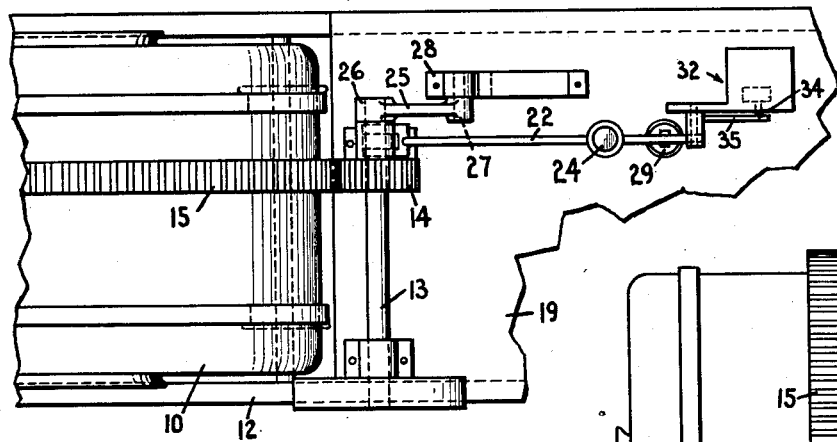
FIG. 2
FIG. 3
FIG. 4
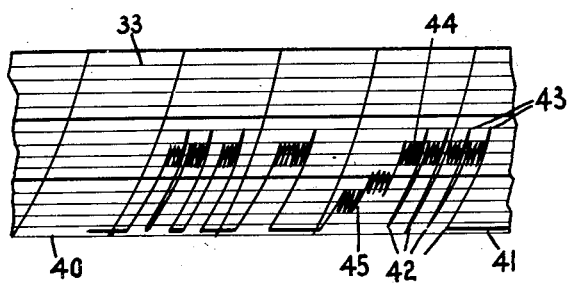
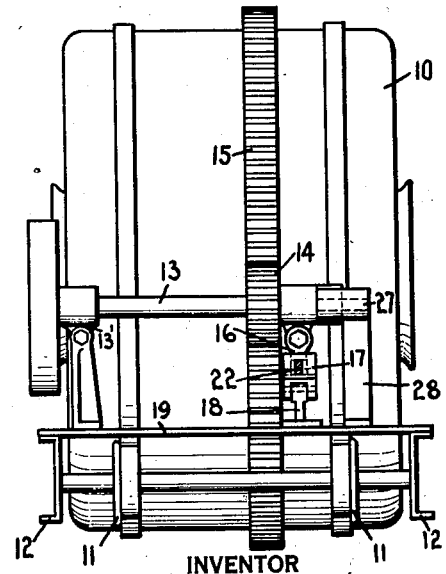
INVENTOR
*Ira A. Butcher*
BY
ATTORNEY Patented Nov. 13, 1934

1,980,184

UNITED STATES PATENT OFFICE 1,980,184

CONTROL RECORDING APPARATUS

Ira A. Butcher, Brooklyn, N. Y.

Application April 5, 1932, Serial No. 603,357

2 Claims. (Cl. 265—25)

The invention relates to measuring means such as indicating and/or recording mechanism, and more especially as applied to apparatus intermittently and/or variably operated from a suitable source of power and wherein the power requirements are variable. The novel mechanism is particularly applicable to mixer apparatus, and it has for an object the provision of measuring mechanism for accurately determining the uniformity or consistency of successive batches of mixed material as put through the same mixer.

A further object of the invention resides in the provision of apparatus whereby not only may an indication and/or a record of the character of the operation performed be obtained, but a record of the individual periods of the different stages in the operation of the apparatus may be afforded.

Another object of the invention resides in the provision of simple and rugged mechanism for this purpose suitable to the rough character of the work effected by the mixer apparatus.

In carrying out the invention, for example, as embodied in connection with the operation of a concrete mixer, either of the stationary or portable type, an element of the power train for driving the mixer apparatus is so mounted as to be capable of independent movement relatively to the train and proportionately to the power transmitted through the said train. This movement is arranged to be multiplied through intermediate mechanism and transmitted thereby to a measuring element such as a recording stylus whose trace upon a suitable record chart will then serve as a measure not only of the character of the operation performed by the mixer apparatus with respect to the components of the mix, but as well as a measure of the length of the period over which such operation or operations was conducted.

That is to say, in the use of the novel recording mechanism, a record may be obtained of any variation in the power required to operate the mixer at any given instant, and such record will thus indicate any variation in power required for any one batch as compared with the preceding or following batches. As a power variation results, for example, from a change in mixture such as total quantity of materials in the batch being mixed, or a change of its components as water, cement, or aggregate in concrete, the record furnishes evidence to the operator that a change has taken place so that investigation may be made and correction applied.

Furthermore, by the use of the novel device, a positive and correct record of the number of batches put through the mixer for a day's operation, or for any period of time within the capacity of the chart, is obtainable. Moreover, from an inspection of the chart, any delay in charging the mixer promptly after it has been emptied is apparent, as well as any delay in emptying the mixer after the charge has been mixed the required period of time. This tends to eliminate lost time and to increase the output of the mixer without loss in control of the desired quality of the mix.

When applied to the truck type of mixers (in which the mixing is effected in transit) a check is had on the time the batch has been in process of mixing, and there may thus be eliminated the objectionable uncertainty that otherwise exists as to how long a charge has been mixed when it arrives at its destination.

In carrying out the invention, provision is made to mount one of the rotatable elements of the power train, for example, of a concrete mixer, in such a manner that the same may be permitted to have a slight movement relatively to the remainder of the train but insufficient to effect disengagement therewith.

This movement which results from the reaction of the pressure exerted in transmitting the power through the train is translated into movement of a recording element through intermediate transmitting mechanism and by which is provided a record whose height is a function of the power transmitted and increasing with the movement of said transmitting mechanism.

The nature of the invention, however, will best be understood when described in connection with the accompanying drawing, in which:

Fig. 1 is a front elevation of the invention as applied to a conventional concrete mixer.

Fig. 2 is a fragmentary plan thereof, and Fig. 3 is an end view of the mixer and portion of the associated measuring means.

Fig. 4 is a fragmentary view of a record chart with a portion of the trace or record produced, in the operation of a concrete mixer, by the novel recording apparatus.

Referring to the drawing, 10 designates the mixing drum of a concrete mixer, carried by suitable rollers 11 which are supported on a frame 12, the drum being rotated from a suitable source of power (not shown) through a driving train embodying the driving shaft 13, driving pinion 14 thereon, and the circular rack or annular gear 15 which meshes with the pinion and is carried by the drum 10.

Contrary to the usual practice, the bearing supporting the shaft 13 is not fixed but is arranged to float, as in being supported upon a jointed arm 16 of a toggle member whose other arm 17 is pivoted to a fixed support 18 mounted upon a plate 19 carrying the entire recording apparatus and designed to be supported upon the frame 12. A further jointed bearing support 13' is provided for the shaft 13.

The pin 20 pivoting arm 17 to the fixed support is offset with respect to the pin 21 pivoting arm 16 to the arm 17 so that force exerted downwardly upon the shaft 13, through the reaction thereon produced in the exertion of pressure by the gear teeth of the pinion in transmitting power to the drum, will cause the pin 21 to rotate about the pin 20, which motion is transmitted to an oscillating element or toggle lever 22 attached to arm 17.

In order that the displacement of the pinion 14 shall be small to avoid entire separation of said pinion 14 from its gear 15, as well as to admit of a force measurement, the movement of toggle lever 22 is restricted upwardly through the action of a load member. For example, a compression spring 23 may be caused to apply a load to the movable mounting means in opposition to the downward movement of the pinion 14, the degree of compression of which spring being adjusted through the plunger 24 acting thereon; and the load exerted by the spring will increase with the degree the spring is compressed by the said lever.

Furthermore, to maintain the shaft 13 with its pinion 14 at a suitable distance from the gear 15, a spacer arm 25 is provided having its one end affording a bearing 26 for the said shaft. The latter may rotate freely therein and also move therewith upwardly and downwardly as a whole in an arc about a center located at 27 where the opposite end of the arm is pivoted, as to a suitable standard 28. This will admit of the ready movement of toggle arm 16 supporting the shaft and permit the said shaft 13 not only to rotate freely in its bearing but to move upwardly and downwardly within narrow limits and without materially interfering with the proper meshing of the teeth of pinion 14 and gear 15.

In order to reduce or damp vibration of the toggle arm 22, due to the action of the gear teeth upon one another, suitable damping means such as a hydraulic or pneumatic dash-pot device 29 may be mounted upon the plate 19 and connected with the lever 22 through a link 30.

Upon the plate 19 is also mounted, as upon the standard 31, recording mechanism 32 which comprises a chart 33 of either the circular or strip type and advanced in any conventional manner and at a constant speed. Over this chart is designed to be moved a stylus or recording pen arm 34 which embodies one arm of a bell crank 35 whose other arm is connected to the toggle lever 22 by a link 36.

Thus, movement of the pinion 14 about the pivot 27 will be translated into a movement of the pen arm 34 through the intermediate mechanism hereinbefore described and will produce thereby upon the chart a graphic record or trace of which the height will be proportional to the force required to operate the mixer. Any variation in the operating force will be indicated by a different length of the line traced so that a change in the mixer charge will be reflected in a change in the height of the record upon the chart. That is to say, any change in the quantity of water, cement or aggregate will produce a change in the force required to turn the mixer and a resultant change in the record upon the chart will be apparent and will thus enable an operator to check and to correct the charge. This is of special importance in relation to the water content of a charge as the total quantity of water of such charge will consist of a measured portion which is added to the cement and aggregate, plus additional water which is carried by the sand and coarse aggregate and which will vary greatly in its total quantity—usually ranging from 2-8 pounds per cubic foot of aggregate.

As it is essential in order to produce concrete of uniform strength and workability that the total water content remain approximately constant, the novel recording apparatus herein set forth will be of material assistance to an operator in controlling his mixture and will afford as well a graphic record of its uniformity or lack of uniformity. For example, referring to the record, Fig. 4 of the drawing, it will be noted that the lowest or datum line 40 represents the condition of the mixer with no power being transmitted; while at 41 the record indicates that the mixer is idling, and the duration of such idling will be measured by the length of this horizontal line. As indicated at 42, which represents the loading operation of the mixer, the record shows that an appreciable time was consumed before a load was introduced into the said mixer.

The succeeding lowest portions of the trace, as at 42, indicate a rapid loading following the unloading. After the mixer has been fully loaded, it will be noted that the curve goes to its highest position, as at 43, and then in a short period of time drops to a lower point 44. This is the stage at which the water introduced into the mix has become suitably intermingled therewith so that less power is required in the mixing operation.

When the desired time of mix has elapsed, which is indicated by the length of the heavy band portion 44—the width resulting from the irregular power requirements in the mixing operation—a rapid drop to the idling line 41 indicates that the load has been removed. In the graph shown at 45 several unloading operations were conducted, that is to say, the entire load was not removed at one and the same time.

I claim:

1. In measuring mechanism for power driven apparatus: a gear train for transmitting power and including a driving pinion, means mounted coaxially with the pinion for rotating the same, means for swingably mounting said pinion about an axis displaced substantially from the axis of rotation of the pinion for partial disengagement with its companion gear and substantially tangentially thereto, means to apply a load continuously to the said pinion to cause the same to maintain full meshing engagement when no power is being transmitted by the gear train, and a measuring element actuated by the tangential movement of the said pinion when power is transmitted therethrough and which movement is a function of the transmitted power.

2. In measuring mechanism for power driven apparatus: a gear train for transmitting power and including a driving pinion, means mounted coaxially with the pinion for rotating the same, means for swingably mounting said pinion about an axis displaced substantially from the axis of rotation of the pinion for partial disengagement with its companion gear and substantially tangentially thereto, means to apply a load continuously to the said pinion to cause the same to maintain full meshing engagement when no power is being transmitted by the gear train and increasing with the extent of disengagement when power is being transmitted, and a measuring element actuated by the tangential movement of the said pinion when power is transmitted therethrough and which movement is a function of the transmitted power.

IRA A. BUTCHER.